Aug. 10, 1954  C. M. DUNLAP  2,685,949
CLUTCH MECHANISM
Filed Feb. 21, 1952
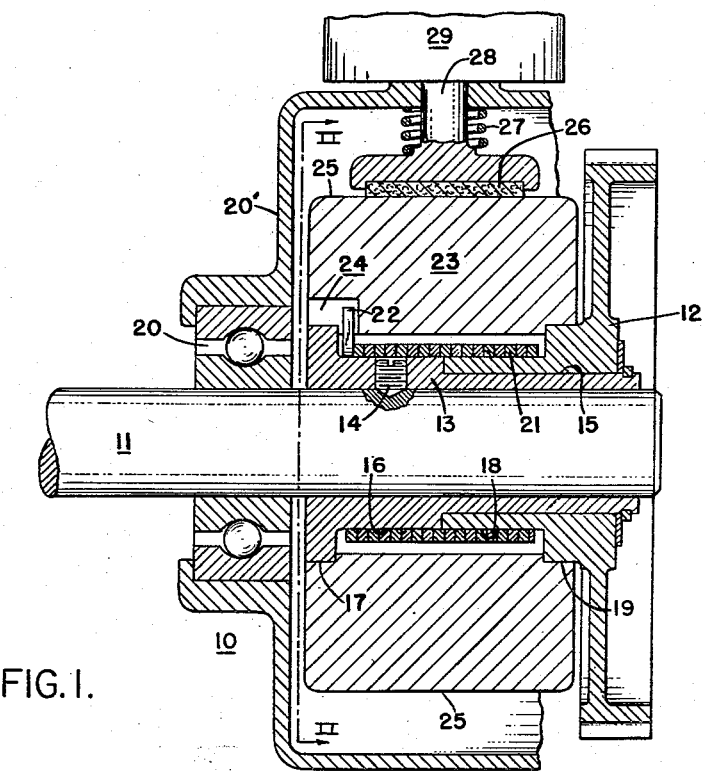
FIG. 1.
FIG. 2.
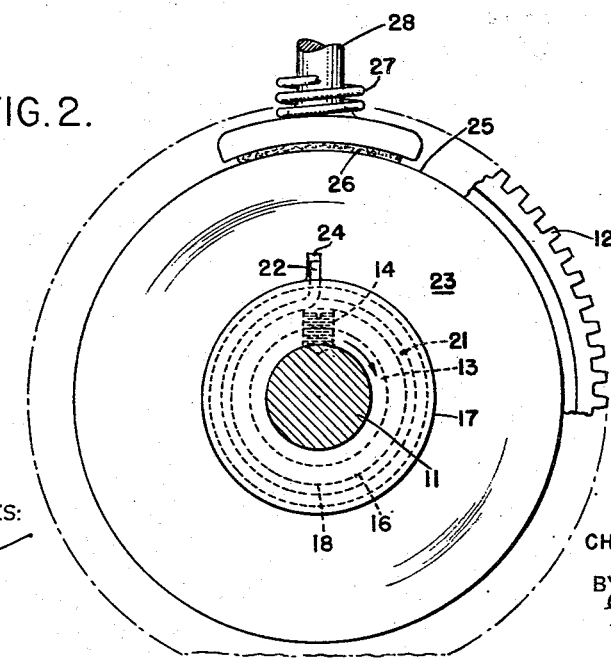
WITNESSES:
INVENTOR
CHARLES M. DUNLAP
BY 
ATTORNEY Patented Aug. 10, 1954

2,685,949

UNITED STATES PATENT OFFICE 2,685,949

CLUTCH MECHANISM

Charles M. Dunlap, Mansfield, Ohio, assignor to Westinghouse Electric Corporation, East Pittsburgh, Pa., a corporation of Pennsylvania Application February 21, 1952, Serial No. 272,786

3 Claims. (Cl. 192—41)

My invention relates to spring type clutches and has for an object to provide improved apparatus of this kind.

A further object of the invention is to provide smooth acceleration of the driven member of a clutch of the type set forth.

A conventional spring clutch includes driving and driven members having axially aligned, cylindrical, driving and driven surfaces that are juxtaposed. A helical spring surrounds these cylindrical surfaces and is so wound or formed that it engages the surfaces with an interference or drag fit. The spring is wound right or left hand depending upon the direction of rotation of the driving member. If unobstructed, the spring tends to wind tightly on the clutching surfaces and defines a driving connection between the driving and driven member and rotates therewith. One end of the spring is bent away from the helix for forming a tang which rotates with the spring. Disengagement of the spring from the driving clutch surface is effected by stopping rotation of the tang so that further rotation of the clutch driving surface unwinds the spring, increasing its helix diameter and, therefore, disengaging the spring from the clutch driving surface. Upon releasing the tang, the spring helix winds slightly, again gripping the cylindrical driving surface for transmitting motion thereof to the driven member. This operation of a spring clutch is now well understood in the art.

One disadvantage of a clutch of this kind when driven at relatively high speed is the sudden shock imparted to the driven member when the tang is released. At this time, the helix winds or closes on the driving surface with substantially no slip even though the clutching surfaces and the spring are immersed in oil. Furthermore, in a clutch of this type, the greater the torque transmitted to the spring, the tighter it winds on the clutching surfaces so that there is no slip between these members with increase in load.

In accordance with my invention, means is provided for gradually winding or closing the spring on the driving surface. This operation is also effected by the provision of an inertia member of predetermined mass which is driven by the tang and which, while rotatable with the spring, is free to move angularly thereabout for effecting unwinding or winding of the spring.

A brake or restraining device is associated with the rotary inertia member for engaging and disengaging the clutch. With the brake disengaged, the inertia member rotates with the spring helix, which now tightly grips the clutching surfaces and constitutes a driving connection therebetween. By applying the brake, rotation of the inertia member is retarded, as is the tang, so that the spring helix is unwound and the clutch is disengaged. So long as rotation of the inertia member and the tang is retarded or stopped, the spring will be deflected to its unwound or open position. Upon releasing the brake for the engagement of the clutch, the spring winds to grip the driving surface and therefore initiate rotation of the spring. Grabbing of the clutching surface by the spring is prevented as the inertia member, through the tang, retards the winding movement of the spring. The inertia member must be accelerated by the tang to permit winding of the spring helix and the mass of the inertia member will determine the rate of its acceleration. Accordingly, the winding of the spring upon the driving surface will be gradual and slip between these members will obtain until the inertia member and spring are rotating at the speed of the clutching surfaces.

The foregoing and other objects are effected by my invention as will be apparent from the following description taken in connection with the accompanying drawings, forming a part of this application, in which:

Fig. 1 is a sectional view taken through a clutch structure constructed and arranged in accordance with this invention; and Fig. 2 is a view partially in section and partially in elevation of the clutch structure as viewed from the plane II—II of Fig. 1.

Referring now to the drawing, I have shown my invention applied to a clutch structure generally indicated at 10 and including a driving shaft 11 which may, for example, be connected to an electric motor (not shown). The driven member of the clutch is shown by way of example as a gear 12. The driving member for the clutch 10 is formed as a sleeve 13 secured to the shaft 11 in any well understood manner, as, by means of a set screw 14. The sleeve 13 is shown to include a journal portion 15 upon which the gear 12 is rotatably mounted. The sleeve 13 also includes a generally cylindrical clutching surface 16 and a second journal portion shown at 17 for a purpose to be referred to hereinafter. The driven element or gear 12 is suitably bored for a running fit on the journal 15 and is provided with a clutching surface, indicated at 18, which is cylindrical in configuration and axially aligned with the clutching surface 16. The gear 12 is also provided with a journal portion 19 to be referred to hereinafter. The driving shaft 11 is supported by a suitable bearing 20 carried by a casing shown, in part, at 20'.

The clutch structure 10 includes a helical clutch spring 21 closely wound and surrounding both clutching surfaces 16 and 18, as shown. The driving end of the spring 21 is provided with an outwardly or radially-extending tang 22 which, when unobstructed, permits rotation of the spring 21 with the driving clutching surface 16. Assuming that the driving shaft rotates in the direction of the arrow or clockwise, as viewed in Fig. 2, the spring 21 will be wound left hand. The internal diameter of the spring 21 is such that an interference fit is provided on both of the clutching surfaces 16 and 18. Accordingly, when the tang 22 is unobstructed, the friction between the driving end of the spring and the clutching surface 16 will tend to carry the coils of the spring along with the clutching surface as the latter rotates. This operation will, of course, tend to wind the spring in the direction of rotation and the internal diameter of the spring is slightly reduced throughout its axial length, whereby the friction between the spring and the clutching surfaces 16 and 18 increases to permit no slip therebetween. Therefore, the driving and driven surfaces 16 and 18 of the clutch are tied together by the spring 21 and rotate in unison therewith.

In spring type clutches as described up to now, the operation is extremely rapid and the clutch is engaged with substantially no slip between the spring and either clutching surface 16 and 18. It is characteristic of this type of clutch that the greater the load which the spring must carry, the tighter it is wound on the clutching surfaces. In order to disengage this type of clutch, the rotation of the tang 22 is interrupted, whereupon the driving end of the spring 21 is unwound increasing the diameter of the helix and permitting rotary motion of the driving surface 16 relative the spring 21. The operation of a spring type clutch as described, up to now, is well understood in the art. The disadvantages of this type of clutch when driven by a shaft of a motor at a relatively high speed is that the mechanism is subjected to considerable shock when the tang 22 is released for engaging the clutch. This, of course, is objectionable in many appliances to which a clutch of this type might be applied.

In accordance with the present invention, improved means is provided for controlling the tang 22 and the operation of the clutch spring 21. As shown an annular member 23 of predetermined mass is supported upon the journal portions 17 and 19 for relative rotary movement therewith. The member 23 is provided with a recess 24 within which the tang 22 is disposed so that there is substantially no relative rotary movement between the tang 2 and the member 23. The outer margin of the member 23 constitutes a cylindrical braking surface 25 engageable with a brake shoe 26 of suitable construction. The brake shoe 26 may be moved into and out of engagement with the braking surface in any suitable manner. As shown, the shoe 26 is biased into engagement with the surface 25 by a compression spring 27 and is connected to a movable element 28 of a solenoid 29. When the latter is energized, the spring 27 is compressed and the shoe 26 moved away from the braking surface 25.

As shown in the drawing, the brake shoe 26 engages the inertia member 23 and maintains the latter stationary. At this time, the shaft 11 and sleeve 13 rotate relative the spring 21 and the member 23. Winding of the spring 21 into driving relation with the clutching surface 16 is prevented as the tang 22 is maintained stationary by the member 23. The clutch 10 is engaged by the energization of the solenoid 29 which retracts the shoe 26 for the release of the inertia member 23. Due to the interference fit between the spring 21 and the driving surface 16, a turning moment is imparted to the spring 21 and tang 22 and the spring tends to wind or close on the clutching surface 16. This operation is retarded by the inertia member 23, now driven by the tang 22, so that complete closure or gripping of the spring 21 on the clutching surface 16 is prevented so long as the inertia member 23 is being accelerated. The period of acceleration will, of course, depend upon the mass of the member 23 and the scale of the spring 21. During acceleration of the member 23, the slip between the clutch driving surface 16 and the spring will gradually decrease from 100% to zero, so that smooth acceleration of the spring 21 and the driven member 12 is realized. During this clutching operation, just described, the driven member 12 and its clutching surface 18 accelerate with the spring 21 as there is substantially no slip between the coils of the spring 21 that engage the driven clutching surface 18 at any time during acceleration.

Deenergization of the solenoid 29 permits the spring 27 to engage the shoe 26 and braking surface 25 whereupon deceleration of the inertia member 23 is initiated. The driving connection between the clutching surface 16 and the spring 21 is interrupted as soon as deceleration of the inertia member 23 starts because the tang 22 is continuously restrained for unwinding or expanding the coils of the spring 21 which cooperate with the clutching surface 16. Free-wheeling or overrunning of the driven gear 12 and its clutching surface 18 relative the spring 21 is, of course, permitted during deceleration of the spring 21, or, at any time that the driven gear 12 rotates faster than the spring 21.

From the foregoing description, it will be apparent that I have provided an improved spring type clutch structure wherein smooth acceleration of the driven element of the clutch is realized even though a rapidly operating actuator, such as a solenoid, is utilized for controlling the clutch.

While I have shown my invention in but one form, it will be obvious to those skilled in the art that it is not so limited, but is susceptible of various changes and modifications without departing from the spirit thereof.

What I claim is:

1. In a clutch structure, the combination of driving and driven members having respective, axially aligned, cylindrical clutching surfaces, a helical spring engaging said clutching surfaces and having an interference fit therewith, said spring having a tang extending from the end thereof which engages the clutching surface of the driving member, an inertia member of predetermined mass engaging said tang, means for rotatably supporting the inertia member coaxially of said clutching surfaces, braking means associated with the inertia member and control means actuated at will for engaging and disengaging the braking means and the inertia member.

2. In a clutch, the combination of a driving member having a cylindrical clutching surface formed thereon, bearing means for supporting the driving member for rotation about an axis, a driven member journalled on the driving member and including a clutching surface axially aligned with the clutching surface of the driving member, a helical drive spring engaging both clutching surfaces and having an interference fit therewith, said spring including a tang extending from the portion thereof which engages the clutching surface of the driving member, an annular inertia member rotatably supported by said driving and driven members for rotation about said axis, means connecting the inertia member and said tang, a friction brake engageable with the inertia member for controlling rotation thereof and electrically operated control means for activating and inactivating the friction brake at will.

3. In a clutch structure, the combination of driving and driven members having respective, axially aligned, cylindrical clutching surfaces, a generally helical drive spring engaging said clutching surfaces and having an interference fit therewith, an inertia member of predetermined mass, means supporting said inertia member for rotation about the axis of said cylindrical clutching surfaces, means connecting said inertia member to the end of said helical spring adjacent said driving member, a friction brake associated with said inertia member and a solenoid operated mechanism for applying and releasing the friction brake at will.

References Cited in the file of this patent

UNITED STATES PATENTS

| Number | Name | Date |
| --- | --- | --- |
| 1,063,064 | Ramsay | May 27, 1913 |
| 1,203,528 | Gardner | Oct. 31, 1916 |
| 2,004,650 | Collyear | June 11, 1935 |
| 2,577,181 | Christensen | Dec. 4, 1951 |